April 14, 1931. O. GIRRBACH 1,800,521
SAW FOR BUTCHER BLOCKS
Filed Dec. 18, 1928 2 Sheets-Sheet 2
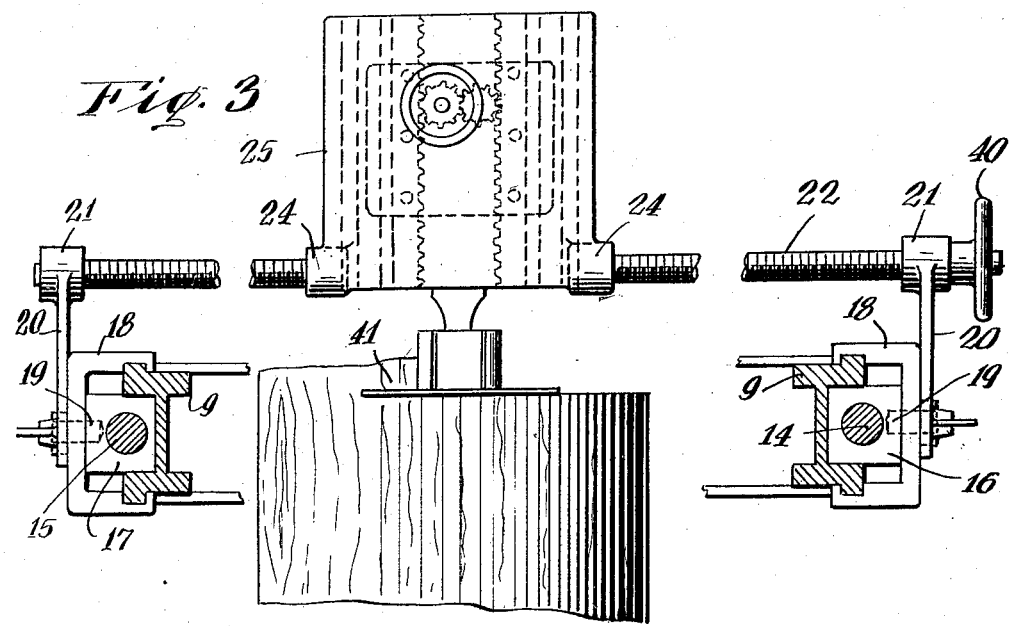
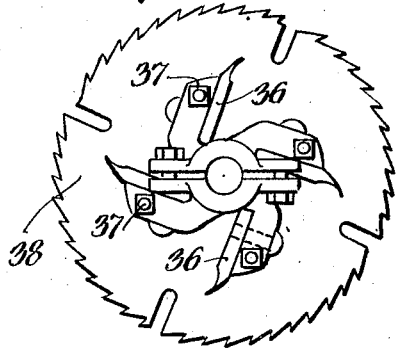
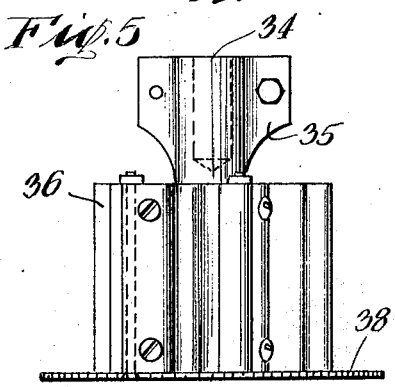
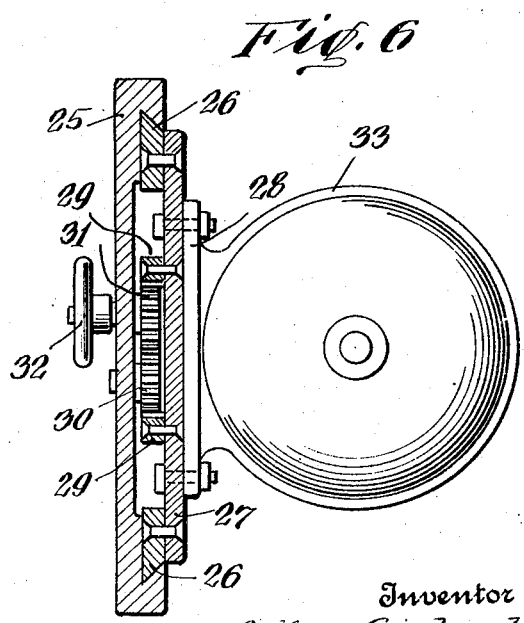
Inventor
Oskar Girrbach
By his Attorney Patented Apr. 14, 1931

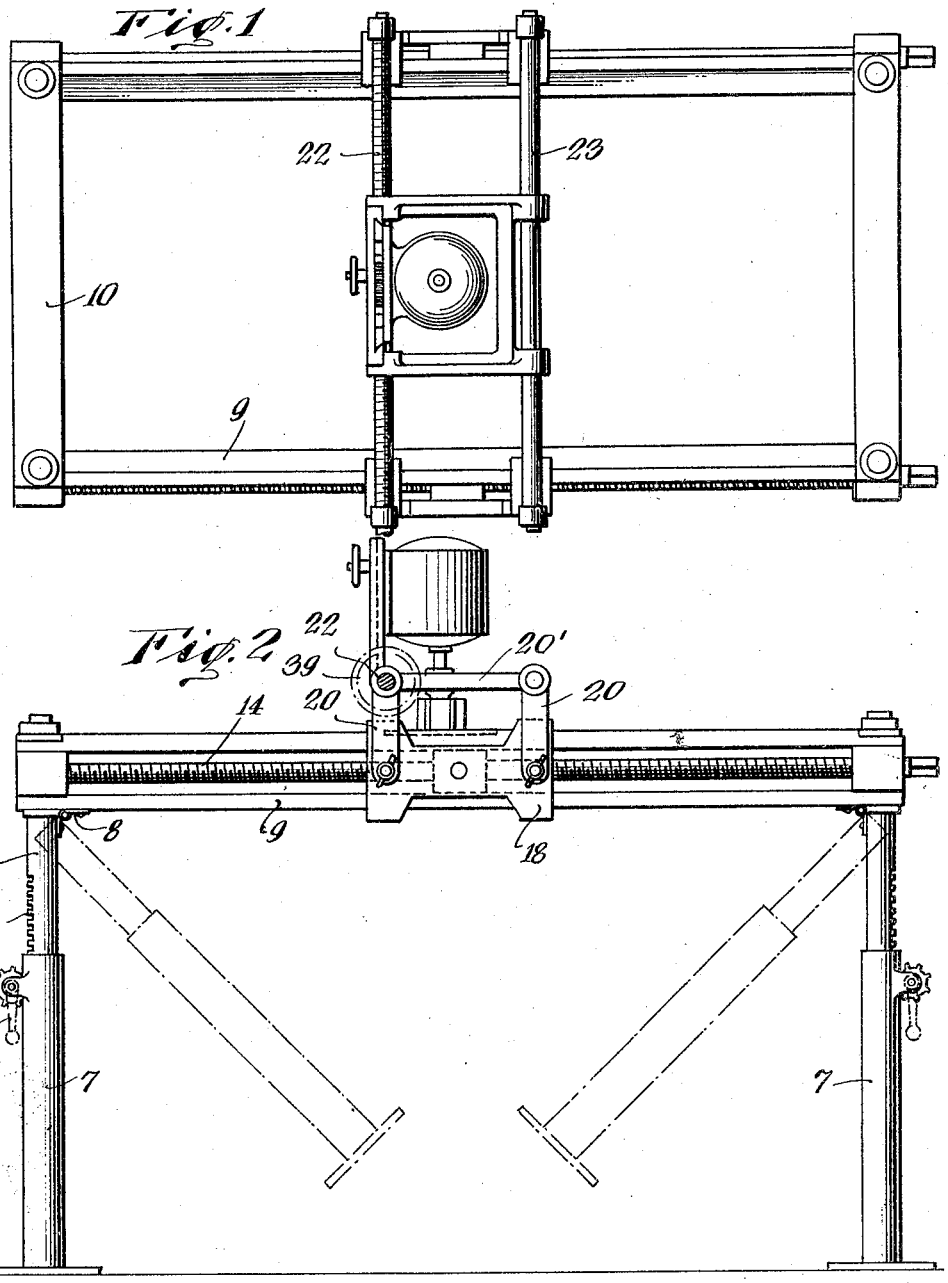

1,800,521

UNITED STATES PATENT OFFICE

OSKAR GIRRBACH, OF LONG ISLAND, NEW YORK

SAW FOR BUTCHER BLOCKS

Application filed December 18, 1928. Serial No. 326,757.

This invention relates to saws, and more particularly to devices for sawing butcher blocks and similar large blocks of wood.

Due to the unusual diameter of butcher blocks, it is a somewhat difficult matter to saw and trim such blocks, especially after the block has been mounted upon supporting legs.

It is, therefore, an object of this invention to provide a device which will facilitate the sawing of large blocks of wood, such as a butcher block.

A further object of this invention is the provision of an adjustable sawing device which is adapted for use in numerous situations wherein the sawing of large blocks of wood is involved.

These and other objects are attained by the novel construction, combination and arrangement of parts hereinafter described and shown in the accompanying drawing, constituting a material part of this disclosure and in which:—

Figure 1 is a plan view of the sawing device.

Figure 2 is a side view of the sawing device.

Figure 3 is an end sectional view of the sawing device.

Figure 4 is a plan view of the saw used in the device.

Figure 5 is a side view of the saw used in the device.

Figure 6 is a sectional plan view of the mechanism for operating and adjusting the position of the saw.

Referring to the drawings, the device is shown to include four tubular supporting legs 7, in which are telescoped the rods 7', hinged at 8 to the side rails 9, the latter being joined by end bars 10. The rods 7' are provided with racks 11, which engage pinions 12, operable by handles 13 to adjust the height of the legs.

Fixed to the end bars 10 are rods 14 and 15, upon which are mounted blocks 16 and 17, the block 16 being in threaded engagement with the thread rod 14. The blocks 16 and 17 are clamped to U-shaped members 18 by means of set screws 19, the members 18 being slidable on the rails 9.

Members 18 have attached thereto a pair of legs 20 which are joined at their upper ends by bars 20'. The legs 20 are provided with integral collars 21 in which are mounted the rods 22 and 23, the rod 22 being threaded.

A pair of threaded collars 24, integral with plate 25 is provided with bevelled grooves in which are slidably mounted the bevelled bars 26, to which are fixed, the plate 27, the latter being fixed to plate 28.

Attached to plate 27 are a pair of racks 29 in engagement with gears 30 and 31, which are in mesh with each other, the gear 31 being provided with a handle 32 by which it may be rotated to cause the bevelled bars 26 to slide in the grooves in plate 25 and thus adjust the height of the motor 33 attached to plate 28.

Clamped to the shaft 34 of the motor 33 is a collar 35, which has integral therewith a plurality of cutting blades 36. By means of bolts 37 passing through the blades 36 the saw 38 is connected to the blades.

In operation, by means of the handle 40 the motor and saw may be adjusted laterally of the table on the threaded rod 22, and by rotating the bars 14, 15, the saw may be adjusted longitudinally of the table with the threaded rod 22. As the saw cuts through the block, the blades or knives 36 chop off the sawed portion 41 of the block above the saw 38 as shown in Figure 3.

From the above description it will be seen that there has been provided a practical device for sawing large butcher blocks, which device, by means of the folding legs may be transported from block to block as may be desired.

The foregoing disclosure is to be regarded as descriptive and illustrative only, and not as restrictive or limitative of the invention, of which obviously an embodiment may be constructed including many modifications without departing from the general scope herein indicated and denoted in the appended claim.

Having thus described my invention, what I claim as new and desire to secure by Letters Patent, is:—

In a motor operated saw having a plurality of radial recesses in its periphery for trimming blocks, a plate attached to the motor, a second plate attached to said motor plate, bevelled bars carried by said second plate, guides for said bevelled bars, a pair of racks attached to said second plate, and gears in mesh with said racks, a handle on one of said gears to allow an operation of said racks and bevelled bars to adjust the height of the motor relative to the work piece to be trimmed, means for shifting the motor longitudinally to the work piece, means for displacing the motor transversely to the work piece, a plurality of cutting blades on the face of said saw combined therewith to trim off the sawed portion of the work piece, and means for securing said blades to said saw.

In witness whereof I have signed my name to this specification.

OSKAR GIRRBACH.